US007853013B2

(12) United States Patent
Vasyltsov et al.

(10) Patent No.: US 7,853,013 B2
(45) Date of Patent: Dec. 14, 2010

(54) CRYPTOGRAPHIC METHOD AND SYSTEM FOR ENCRYPTING INPUT DATA

(75) Inventors: Ihor Vasyltsov, Suwon-si (KR); Hee-kwan Son, Suwon-si (KR); Yoo-jin Baek, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1252 days.

(21) Appl. No.: 11/431,552

(22) Filed: May 11, 2006

(65) Prior Publication Data

US 2006/0280296 A1 Dec. 14, 2006

(30) Foreign Application Priority Data

May 11, 2005 (KR) ...................... 10-2005-0039095

(51) Int. Cl.
*H04L 9/28* (2006.01)
*H04K 1/00* (2006.01)

(52) U.S. Cl. ........................................ 380/28; 708/490

(58) Field of Classification Search ....................... None
See application file for complete search history.

(56) References Cited

U.S. PATENT DOCUMENTS 6,088,798 A * 7/2000 Shimbo ...................... 713/176
6,611,597 B1 * 8/2003 Futa et al. ...................... 380/30
7,298,839 B2 * 11/2007 Eisentraeger et al. ......... 380/30
7,680,270 B2 * 3/2010 Srungaram ................... 380/30
2004/0098436 A1 * 5/2004 Futa et al. ................... 708/492
2004/0228484 A1 * 11/2004 Yanagisawa ................. 380/44
2005/0021941 A1 * 1/2005 Ohmori et al. .............. 713/156
2005/0036606 A1 * 2/2005 Eisentraeger et al. ......... 380/28
2007/0177721 A1 * 8/2007 Itoh et al. ..................... 380/28
2007/0189527 A1 * 8/2007 Brown et al. .................. 380/44
2008/0137839 A1 * 6/2008 Eisentraeger et al. ......... 380/28
2008/0219437 A1 * 9/2008 Ebeid .......................... 380/30

FOREIGN PATENT DOCUMENTS

JP 2003-216026 7/2003
JP 2004-163687 6/2004
KR 10-2004-0037648 5/2004

* cited by examiner

*Primary Examiner*—Christopher A Revak
(74) *Attorney, Agent, or Firm*—Harness, Dickey & Pierce, P.L.C.

(57) ABSTRACT

A method and system for encrypting input data may include receiving an input point and a randomness rate and generating a random selection value and a random position value from the randomness rate. At least one of the input point and points encrypted by performing elliptic curve (EC) operation over a plurality of rounds may be randomly selected based on the randomness rate and the random position value. The selected point may be converted to a point representation directed by the random selection value. A finally encrypted output point may be generated by performing the EC operation over a plurality of rounds based on the input point and a secret key.

28 Claims, 4 Drawing Sheets

CRYPTOGRAPHIC METHOD AND SYSTEM FOR ENCRYPTING INPUT DATA

PRIORITY STATEMENT

This application claims the benefit of Korean Patent Application No. 10-2005-0039095, filed on May 11, 2005, in the Korean Intellectual Property Office, the disclosure of which is incorporated herein in its entirety by reference.

BACKGROUND OF THE INVENTION

1. Field of the Invention

Example embodiments of the present invention relate in general to a cryptographic method and system for encrypting data.

2. Description of the Related Art

To solve the problems in modern confidential data communications, hardware cryptographic systems based on known crypto-algorithms have become popular in an effort to continually growing performance requirements. These crypto-algorithms include public key algorithms such as the Rivest-Shamir-Adleman (RSA) and Elliptic Curve Cryptography (ECC) algorithm, and symmetric key algorithms, for example, those based on the Data Encryption Standard (DES) and the Advanced Encryption Standard (AES).

However, in addition to hardware-oriented crypto-systems, new crypto-analysis methods, for example, Side-Channel Analysis (SCA) have been developed. There are several different techniques for attacks on data communication systems, typically including Timing Analysis, Power Analysis, Electro-Magnetic Analysis, and Different Faults Analysis (DFA). It is known that these techniques can successfully attack the crypto-systems and obtain secret keys with less time and effort.

Accordingly, developing countermeasures against crypto-analysis methods, for example, SCA is becoming an important task for the future. However, as ECC is a relatively recent branch of cryptography, there is scant literature describing how to counter the SCA for data protection systems adopting the ECC.

For example, in Differential Power Analysis (DPA), which is a type of SCA, power tracks during a scalar multiplication operation are analyzed to obtain information on secret keys. To prevent leakage of information by the DPA, known countermeasure techniques based on the randomization of secret exponent and employed. However, these known techniques are relatively poor in responding to a special chosen-message power analysis attack. To counter this chosen-message power analysis attack, it is possible to use the well-known randomization of input messages.

FIG. 1 illustrates a conventional scalar multiplication process. Referring to FIG. 1, in a conventional crypto-system, an input point is received at operation S11, and then a point representation is selected and changed at operation S12. For example, if the point representation of the input point is an Affine representation, the point representation is changed to a Projective representation, and then a scalar multiplication operation is performed in the chosen point representation of operation S13.

An affine representation of a topological (Lie) group G is a continuous (smooth) homomorphism (e.g., structure-preserving map between two algebraic groups, for example, groups or vector spaces) G to the automorphism group of an affine space A. An automorphism is an isomorphism from a mathematical object to itself or a symmetry of the object, and a way of mapping the object to itself while preserving all its structure; the set of all automorphisms of an object is the automorphism group, or "symmetry group" of the object.

In mathematics, for example, in group theory, if G is a group and P is a vector space over a field K, then a projective representation is a homomorphism from G to $\mathrm{Aut}(\rho)/K^x$, where $K^x$ is the normal subgroup of $\mathrm{Aut}(\rho)$ consisting of multiplications of vectors in $\rho$ by nonzero elements of K (e.g., scalar multiples of the identity), and $\mathrm{Aut}(\rho)$ represents the automorphism group of the vector space underlying $\rho$.

As is well known, an encrypted point is generated by the scalar multiplication operation of a secret key and the input point based on an ECC algorithm. The scalar multiplication operation can be iterated for a plurality of rounds to fit a system specification. When the scalar multiplication operation is complete, a point representation of the encrypted point is changed to another point representation (e.g., Affine representation) at operation S14. An output point obtained by changing the point representation of the encrypted point to the original point representation is output (S15) to a post-processor for sign/verification.

In the conventional crypto-system configured to resist DPA attacks, secret key masking or input point masking can be used. However, in the conventional crypto-system, since a complex scalar multiplication operation is duplicated for a plurality of rounds in parallel, this may lead to an increase in costs and a considerable reduction in performance. Accordingly, it may not be feasible to apply the conventional crypto-system to a plurality of actual applications.

SUMMARY OF THE INVENTION

An example embodiment of the present invention is directed to a method for encrypting input data. A method in accordance with example embodiments may include receiving an input point and a randomness rate and generating a random selection value and a random position value from the randomness rate. At least one of the input point and points encrypted by performing elliptic curve (EC) operation over a plurality of rounds may be randomly selected based on the randomness rate and the random position value, The selected point may be converted to a point representation directed by the random selection value. A finally encrypted output point may be generated by performing the EC operation over a plurality of rounds based on the input point and a secret key.

Another example embodiment of the present invention is directed to a cryptographic system for encrypting input data. A system in accordance with example embodiments may include a scalar multiplication unit adapted to randomly select, based on a randomness rate and a random position value, at least one of an input point and points encrypted by elliptic curve (EC) operation over a plurality of rounds. The scalar multiplication unit may be adapted to generate a finally encrypted output point by performing the EC operation over a plurality of rounds based on the input point and a secret key. A system in accordance with example embodiments may include a random number generator adapted to generate a random selection value and the random position value from the randomness rate. A system in accordance with example embodiments may include a point representation converter adapted to generate the changed point by converting the selected point to a point representation directed by the random selection value.

Another example embodiment of the present invention is directed to a cryptographic system which includes a plurality of elliptic curve (EC) operation units, a plurality of point representation converters and a random number generator. The plurality of EC operation units may be adapted to perform an EC operation based on an input point and a secret key in every round. Each of the plurality of point representation converters is located before and after the plurality of EC operation units, and may be adapted to randomly select, based on a randomness rate and a random position value, at least one of an input point and points encrypted by EC operation. Each of the point representation converters may be adapted to convert the selected point to a point representation directed by a random selection value, and to output the converted point to an EC operation unit in a subsequent round. The random number generator may be adapted to generate the random selection value and the random position value from the randomness rate.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limitative of example embodiments therein.

DETAILED DESCRIPTION OF THE INVENTION

Figure 1:
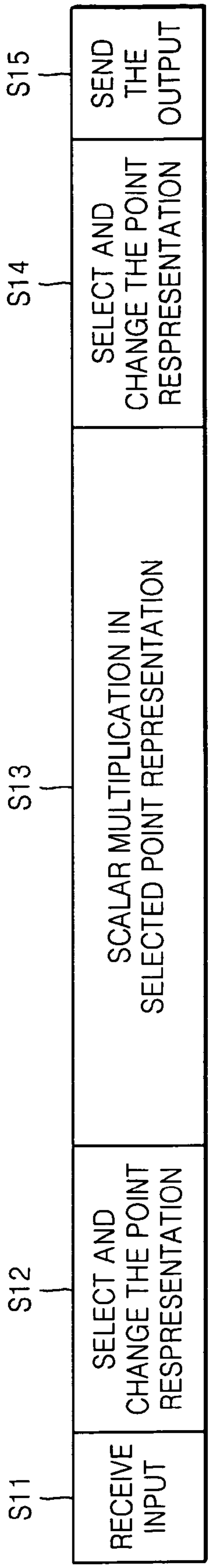
FIG. 1 illustrates a conventional scalar multiplication process.

An example embodiment of the present invention is directed to a cryptographic method which may reduce the efficiency of power analysis attacks by increasing entropy in power tracks using a random point representation, so as to reduce and/or minimize the leakage of useful information from the power tracks. Another example embodiment of the present invention is directed to a cryptographic system for implementing an example method.

An elliptic curve E is a set of points (x,y) which satisfy the elliptic curve equation (Equation 1) in the Weierstrass form where $\alpha_n$(n=1,2,3, . . . ) is a non-zero constant:

$$E: y^2+\alpha_1 xy+\alpha_3 y=x^3+\alpha_2 x^2+\alpha_4 x+\alpha_6. \quad (1)$$

For cryptographic applications, the elliptic curve can be used over a prime finite field GF(p) or a binary finite field GF($2^n$). Here, GF( ) denotes a Galois field (e.g., a finite field with $p^n$ elements, where p is a prime integer), the prime finite field is a field containing a prime number of elements, and the binary finite field is a field containing $2^n$ elements.

The present example embodiment is related to elliptic curve cryptography (ECC) based on the binary finite field. However, the present example embodiment is not limited to ECC based on the binary finite field. It will be understood by those skilled in the art that the present example embodiment can be applied to the prime finite field ECC by performing a modification and may also be applied to any well-known crypto-algorithm.

If $n \geqq 1$, then there is a unique field GF($2^n$) with $2^n$ elements. For the binary finite field case, Equation 1 may be changed to Equation 2:

$$\begin{cases} GF(2^n) \\ y^2+xy=x^3+ax^3+b; \\ b \neq 0 \end{cases}. \quad (2)$$

The elliptic curves have a point addition operation to which is included a partial case, a point doubling operation. For example, to get to the resultant point R=P+Q=($x_3$,$y_1$) from two input points P=($x_1$,$y_1$) and Q=($x_2$, $y_2$), the next finite field operation (Equation 3) in the binary finite field GF($2^n$) is requested:

$$P \neq Q \Rightarrow \begin{cases} \theta = \dfrac{y_2+y_1}{x_2+x_1}; \\ x_3 = \theta^2+\theta+x_1+x_2+a; \\ y_3 = \theta(x_1+x_3)+x_3+y_1; \end{cases}. \quad (3)$$

For the point doubling operation (P=Q), the next finite field operation (Equation 4) is performed in the binary finite field GF($2^n$):

$$P = Q \Rightarrow \begin{cases} \theta = x+\dfrac{y}{x}; \\ x_3 = \theta^2+\theta+a; \\ y_3 = \theta(x+x_3)+x_3+y; \end{cases}. \quad (4)$$

The main operation in ECC is a scalar point multiplication which consists of computing Q=k·P=P+P+ . . . +P (k times), where k is a secret key. The scalar point multiplication is based on the point operations, which in turn are based on the finite field operations: multiplication in the finite field, addition in the finite field and square in the finite field. A related operation is the discrete logarithm, which consists in computing k from P, where Q=k·P.

There are several different possible representations of the point (dot) on the elliptic curve besides the Affine representation (used in the above equations), for example, an Ordinary Projective representation, a Jacobian Projective representation, a Lopez-Dahab Projective representation, etc. As these representations are known mathematical or algebraic representations, a detailed discussion thereof is limited for purposes of brevity. Each of the representations may have its own advantages, for example, improved performance, resistance to certain types of attacks, or may be a system which may be more easily built.

For the Ordinary Projective coordinates in GF($2^n$), Equation 1 can be transformed to Equation 5 where x, y and z represent coordinates on the elliptical curve and α is a non-zero constant. The relation between Equations 1 and 5 can be shown in Equation 6.

$$Y^2Z+XYZ=X^3+aX^2Z+bZ^3, \quad (5)$$

-continued $$\begin{cases} P(x, y) \underset{\substack{X=x \\ Y=y \\ Z=1}}{\Rightarrow} P(X, Y, Z) \\ P(X, Y, Z) \underset{\substack{x=\frac{X}{Z} \\ y=\frac{Y}{Z}}}{\Rightarrow} P(x, y). \end{cases} \tag{6}$$

For Jacobian Projective coordinates in GF($2^n$), Equation 1 can be transformed to Equation 7. The relation between Equations 1 and 7 can be described in Equation 8.

$$Y^2 + XYZ = X^3 + aX^2Z^2 + bZ^6, \tag{7}$$

$$\begin{cases} P(x, y) \underset{\substack{X=x \\ Y=y \\ Z=1}}{\Rightarrow} P(X, Y, Z) \\ P(X, Y, Z) \underset{\substack{x=\frac{X}{Z^2} \\ y=\frac{Y}{Z^3}}}{\Rightarrow} P(x, y). \end{cases} \tag{8}$$

For the Lopez-Dahab Projective coordinates in GF($2^n$), Equation 1 can be transformed to Equation 9. The relation between Equations 1 and 9 can be described in Equation 10.

$$Y^2 + XYZ = X^3Z + aX^2Z^2 + bZ^4 \tag{9}$$

$$\begin{cases} P(x, y) \underset{\substack{X=x \\ Y=y \\ Z=1}}{\Rightarrow} P(X, Y, Z) \\ P(X, Y, Z) \underset{\substack{x=\frac{X}{Z} \\ y=\frac{Y}{Z^2}}}{\Rightarrow} P(x, y). \end{cases} \tag{10}$$

The Weierestrass form of an elliptic curve representation is the most widely used in cryptographic applications and can be summarized as shown in Table 1 for quick conversion of the point representation. In Table 1, A(x,y) denotes the Affine representation, P(X,Y,Z) denotes the Ordinary Projective representation, J(X,Y,Z) denotes the Jacobian Projective representation, and L(X,Y,Z) denotes the Lopez-Dahab Projective representation.

TABLE 1

| Point Conversion | A(x, y) | P(X, Y, Z) | J(X, Y, Z) | L(X, Y, Z) |
|---|---|---|---|---|
| A(x, y) | (x, y) | (x, y, 1) | (x, y, 1) | (x, y, 1) |
| P(X, Y, Z) | $\left(\frac{X}{Z}, \frac{Y}{Z}\right)$ | (X, Y, Z) | $(X \cdot Z, Y \cdot Z^2, Z)$ | $(X, Y \cdot Z, Z)$ |
| J(X, Y, Z) | $\left(\frac{X}{Z^2}, \frac{Y}{Z^3}\right)$ | $\left(\frac{X}{Z}, \frac{Y}{Z^2}, Z\right)$ | (X, Y, Z) | $\left(\frac{X}{Z}, \frac{Y}{Z}, Z\right)$ |
| L(X, Y, Z) | $\left(\frac{X}{Z}, \frac{Y}{Z^2}\right)$ | $\left(X, \frac{Y}{Z}, Z\right)$ | $(X \cdot Z, Y \cdot Z, Z)$ | (X, Y, Z) |

An inverse operation of an element in the EC operation in the binary finite field is achieved as described below. That is, there is known a method of computing an inverse operation of an element in GF($2^n$) by minimizing the number of multiplications. For example, if $\alpha \in GF(2^n)$, $\alpha \neq 0$, then Equation 11 is satisfied.

$$\alpha^{-1} = \alpha^{2^n-2} = (\alpha^{2^{n-1}-1})^2 \tag{11}$$

In Equation 11, if n is odd, then Equation 12 is achieved, thereby satisfying Equation 13. Hence, if $\alpha^{2^{(n-1)/2}-1}$ has been computed by ignoring the cost of squaring, it takes only one multiplication to evaluate the inverse operation (Equation 11).

$$2^{n-1}-1 = (2^{(n-1)/2}-1)(2^{(n-1)/2}+1) \tag{12}$$

$$\alpha^{2^{n-1}-1} = (\alpha^{2^{(n-1)/2}-1})^{2^{(n-1)/2}+1} \tag{13}$$

If n is even in Equation 11, Equation 14 is satisfied. Consequently, if $\alpha^{2^{(n-2)/2}-1}$ has been computed, it takes only two multiplications to evaluate the inverse operation (Equation 11).

$$\alpha^{2^{n-1}-1} = \alpha^{2(2^{(n-2})/2-1)(2^{(n-2)/2}+1)+1} \tag{14}$$

The procedure of the inverse operation may be recursively repeated. This method requires $I(n) = \lfloor \log_2 (n-1) \rfloor + \omega(n-1) - 1$ field multiplications, where $\omega(n-1)$ denotes the number of 1's (Hemming weight) in the binary representation of n−1.

The hypothesis behind a Differential Power Analysis (DPA) attack is that the power tracks are correlated to the instructions that a cryptographic system is executing, as well as the values of the operands that a system in accordance with example embodiments is manipulating. Therefore, examination of the power tracks may reveal information on the instructions being executed and on the contents of data registers. In a case that the cryptographic system is executing a secret-key cryptographic operation, it may then be possible to deduce the secret key.

In Simple Power Analysis (SPA) attacks, information on the secret key can be deduced directly by examining the power track from a single secret key operation. Implementations of EC point multiplication algorithms may be vulnerable because the usual formulas for adding and doubling points are quite different and therefore may have power tracks which can be distinguished. Any implementation where the execution path is determined by the secret key bits has potential vulnerability.

DPA attacks exploit variations in power consumption that are correlated to the data values being manipulated. These variations are typically much smaller than those associated with different instruction sequences, and therefore may be obfuscated by noise and measurement errors. Statistical methods are used on a collection of power tracks in order to reduce the noise and strengthen the differential analysis.

To counter an SPA attack, there are a number of different countermeasures. However, most SPA countermeasures are weak to the DPA attack. Though the DPA attack is relatively more complex as compared to the SPA attack and requires analysis of a substantial number of power tracks, it is still susceptible to leaking the secret information. The complexity of the DPA attack can be measured in terms of the requested number of power tracks and through calculation by hardware resources. Although the time requested to perform an automated DPA attack can range from couple of hours to several weeks, the DPA attack may still be applicable as a reasonable attack method.

Even if a scalar multiplication is protected with an SPA-resistant method, for example, "Always double-and-add" and/or by a DPA-resistant method, for example, randomized projective coordinates, randomized elliptic curves or randomized field representations, for example, the scalar multiplication may still be vulnerable to a DPA attack in situations where a cryptanalyst can select the base point representation.

Accordingly, the inventors propose a method of increasing the complexity of an attack to a more significant level. In the present example embodiment, values in a power track may be randomly changed by randomly changing the point representation during a scalar multiplication process. In a scalar multiplication process, in which the EC operation is executed over a plurality of rounds, encrypted points of randomly selected rounds may be converted to other points and processed.

Figure 2:
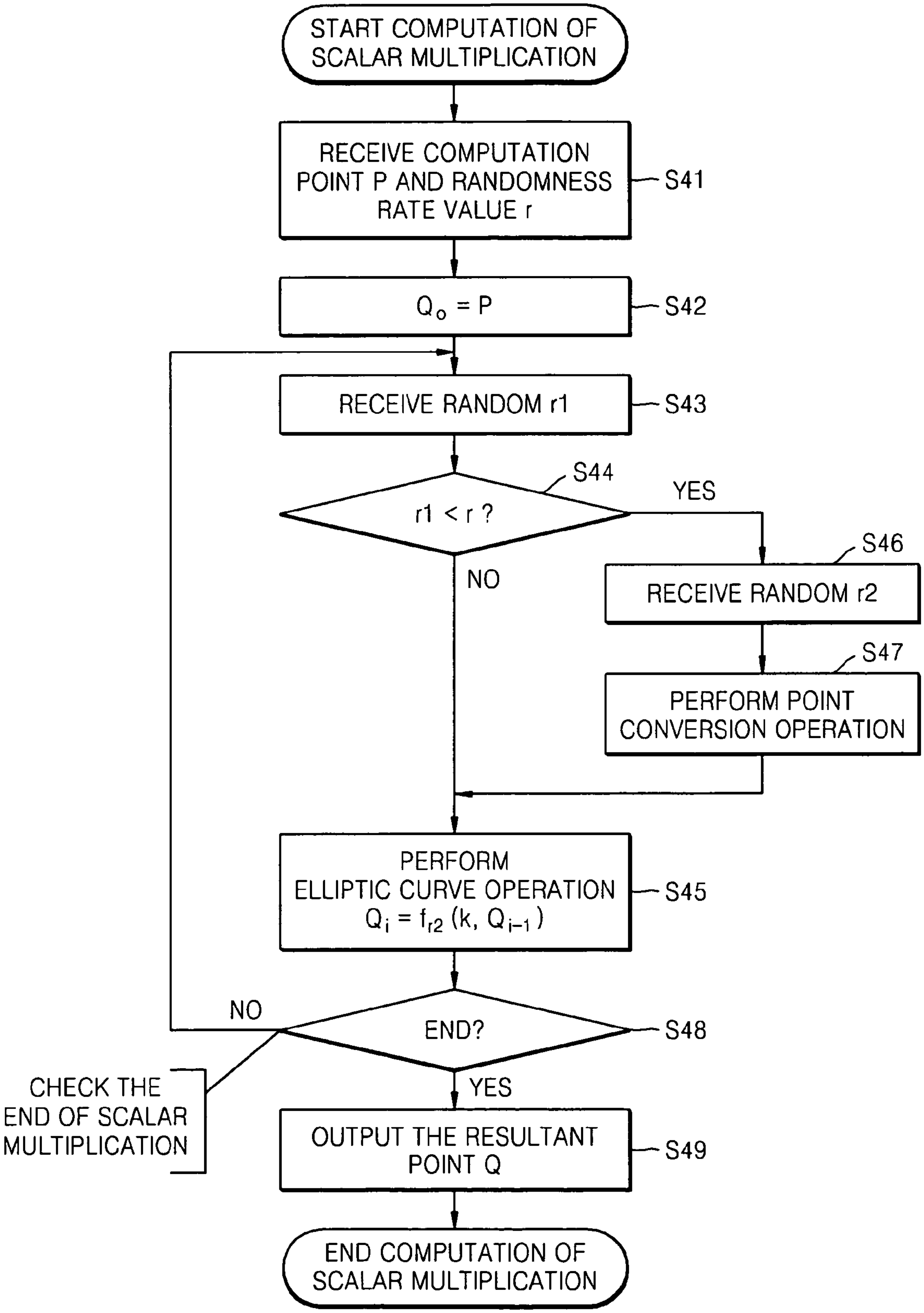
FIG. 2 is a flowchart illustrating a method for encrypting input data according to an example embodiment of the present invention.

FIG. 2 is a flowchart illustrating a scalar multiplication operation to encrypt an input point P according to an example embodiment of the present invention. Referring to FIG. 2, a cryptographic system (as to be explained in further detail with regard to FIGS. 3 and 4) receives the input point P and a randomness rate r at S41. The input point P may represent input data to be encrypted, and the randomness rate r denotes a value for controlling a randomization level of the point representation during the scalar multiplication process. The randomness rate r can be set between 0 to 100% by a user. For example, a randomness rate r of 100% indicates that all of input and output points in the EC operation over a plurality of rounds are to be changed to different point representations. A randomness rate r of 60% indicates that only 60% of the input and output points in the EC operation over a plurality of rounds are to be changed to different point representations. Positions at which the input and output points are changed to the different point representations may be randomly determined.

The cryptographic system sets the received input point P to $Q_0$ (S42), and as shown in S43 through S48, a finally encrypted output point Q may be generated by performing the EC operation over a plurality of rounds, and by randomly selecting the changed positions of the point representations. In other words, the cryptographic system receives a random position value r1 generated by a random number generator 220 (FIG. 3) at S43, and compares the received random position value r1 with the randomness rate r (S44). The random position value r1 is randomly generated within a range of the randomness rate r in every round. If the randomness rate r is equal to or less than the random position value r1 of S44, the cryptographic system generates an encrypted point $Q_i$ by performing the EC operation of a subsequent round without a representation change of a point $Q_{i-1}$ encrypted in the EC operation of a previous round (S45). In the EC operation, the scalar multiplication $Q_i = k \cdot P(Q_{i-1}) = P + P + \ldots + P(k \text{ times})$ is calculated from the point $Q_{i-1}$ encrypted in the previous round and a corresponding secret key k using domain parameters a,b,n in $GF(2^n)$. The secret key k is generated by a given key generator, and the domain parameters a,b,n can be received from a given protected non-volatile memory.

If the randomness rate r is greater than the random position value r1 (output of S44 is 'YES'), the cryptographic system receives a random selection value $r_2$ generated by the random number generator 220 and generates a changed point (S47) by converting the point $Q_{i-1}$ encrypted in the EC operation of the previous round to a point representation directed by the random selection value $r_2$. The random selection value $r_2$ is generated to randomly select one of the plurality of point representations shown in Table 1 in each round. In this case, the cryptographic system generates the encrypted point $Q_i$ by applying the point representation-converted point to a subsequent round (S45).

According to functions S43 through S48, once all of the scalar multiplications are complete (e.g., output of S48 is 'YES'), the finally encrypted output point Q is output (S49) to a post-processor of an upper layer.

Figure 3:
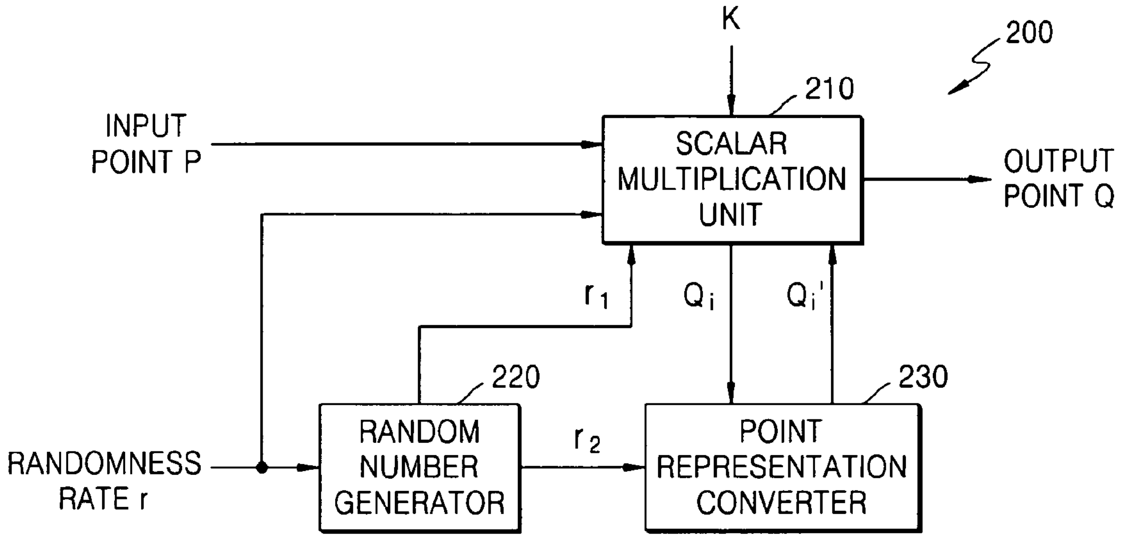
FIG. 3 is a block diagram of a cryptographic system implementing the method of FIG. 2, according to an example embodiment of the present invention.

FIG. 3 is a block diagram of a cryptographic system 200 implementing the method of FIG. 2 according to an example embodiment of the present invention. Referring to FIG. 3, the cryptographic system 200 may include a scalar multiplication unit 210 configured to receive the input point P and the randomness rate r (see S41). The system 200 may include a random number generator 220 configured to randomly generate the random position value r1 and the random selection value $r_2$ from the randomness rate r in every round.

The scalar multiplication unit 210 may be adapted or configured to compare (S44) the randomness rate r with the random position value r1 and to select the input point P. If the randomness rate r is greater than the random position value r1 (output of S44 is 'YES'), then the input point P selected by the scalar multiplication unit 210 is output to a point representation converter 230 which is adapted to change its point representation. The point representation converter 230 may be adapted to generate a changed point $Q_i'$ by converting an input point $Q_i$ selected by the scalar multiplication unit 210 (S47) to a point representation directed by the random selection value $r_2$. The scalar multiplication unit 210 generates the encrypted output point Q by performing the EC operation based on the changed point $Q_i'$ and a secret key of a corresponding round (S45). If the randomness rate r is equal to or less than the random position value r1 (output of S44 is 'NO'), the scalar multiplication unit 210 generates the encrypted output point Q by performing the EC operation at S45 based on a point presentation of a previous round without the point representation change.

Likewise, before the EC operation of an output point encrypted in a previous round is performed in a subsequent round, the scalar multiplication unit 210 compares the randomness rate r with the random position value r1, determines whether to change a point representation, selects a point before or after a corresponding round, and outputs the selected point to the point representation converter 230. The point representation converter 230 may be configured so as to be "shared" to randomly convert the point representation, both before the EC operation and after the EC operation (S47) in every round.

The scalar multiplication unit 210 randomly selects at least one of the input point P and points encrypted by the EC operation over a plurality of rounds, and applies a point obtained by changing a representation of the selected point to a subsequent round. The change of the point representation may be determined based on the randomness rate r and the random position value r1 generated by the random number generator 220 in every round. The kind or type (see Table 1) of the changed point representation may be determined based on the random selection value $r_2$ generated by the random number generator 220 in every round.

Figure 4:
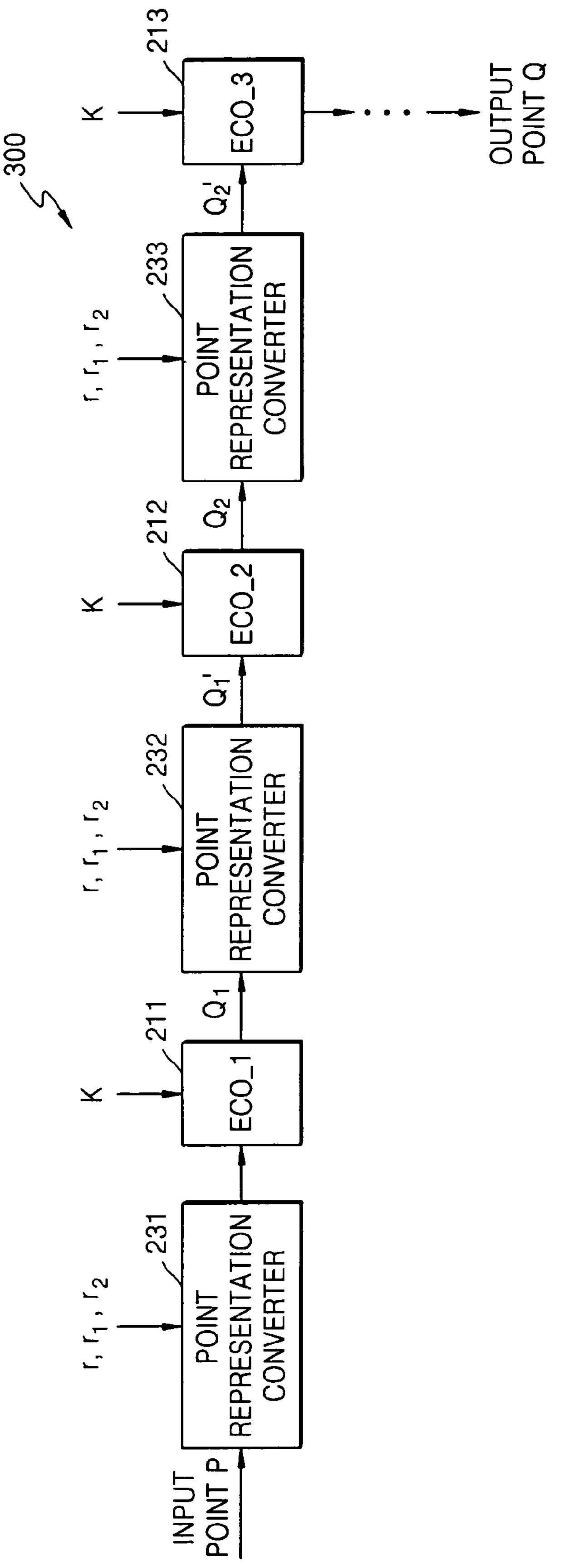
FIG. 4 is a block diagram of a cryptographic system implementing the method of FIG. 2, according to another example embodiment of the present invention.

FIG. 4 is a block diagram of a cryptographic system 300 implementing the cryptographic method of FIG. 2 according to another example embodiment of the present invention. Referring to FIG. 4, the system 300 may include a plurality of EC operation units 211, 212, 213, . . . and a plurality of point representation converters 231, 232, 233, etc. The random number generator 220 shown in FIG. 3 is also included but not shown for purposes of clarity. Unlike the point representation converter 230 that is shared before and after the EC operation in FIG. 3, in the system 300, each given point representation converter 231, 232, 233, etc., is located before and after a corresponding, given EC operation of each round.

The system 300 receives the input point P and the randomness rate r (see S41 of FIG. 2). The random position value r1 and the random selection value $r_2$ are randomly generated by the random number generator 220 from the randomness rate r in every round.

As shown in FIG. 4, a first point representation converter 231 compares the randomness rate r with the random position value r1 before a first EC operation unit 211 (see S44 of FIG. 2) and selects the input point P if the randomness rate r is greater than the random position value r1 (output of S44 is 'YES'). The first point representation converter 231 generates a changed point (S47) by converting the selected input point P to a point representation directed by the random selection value $r_2$. The first EC operation unit 211 generates an encrypted output point $Q_1$ by performing the EC operation based on the changed point and a secret key k of a corresponding round. If the randomness rate r is equal to or less than the random position value r1 (output of S44 is 'NO'), the first point representation converter 231 outputs the input point P to the first EC operation unit 211 without the point representation change. The first EC operation unit 211 generates the encrypted output point $Q_1$ at S45 by performing the EC operation based on the input point P and the secret key k of the corresponding round.

Likewise, before the EC operation of each of the output points $Q_1$, $Q_2$, . . . encrypted in a previous round is performed in a subsequent round, before and after each of the remaining EC operation units 212, 213, . . . , each of the remaining point representation converters 232, 233, . . . compares the randomness rate r with the random position value r1, determines whether to change a point representation, selects a point before or after a corresponding round, and converts the selected point to a point representation as directed by the random selection value $r_2$. According to the conversion, each of the point representation-changed points $Q_1'$, $Q_2'$, . . . is output to a corresponding EC operation unit 211, 212, 213, etc. Each corresponding EC operation unit performs the EC operation based on a point representation-changed or non-changed point and a corresponding secret key, which are input in every round.

Each of the plurality of point representation converters 231, 232, 233, . . . randomly selects at least one of the input point P and points encrypted by the EC operation, converts a representation of the selected point, and outputs the changed point to an EC operation unit of a subsequent round. The change of the point representation is determined based on the randomness rate r and the random position value r1 generated by the random number generator in every round. The kind or type (see Table 1) of the changed point representation is determined based on the random selection value $r_2$ generated by the random number generator in every round.

As described above, since the binary field ECC is performed by randomly changing point representations over a plurality of rounds based on the randomness rate r, the random position value r1 and the random selection value $r_2$ during the scalar multiplication process, the cryptographic method and system according to example embodiments of the present invention may offer a powerful countermeasure against the DPA. For the random point representations, "Affine," "Ordinary Projective," "Jacobian Projective" and "Lopez-Dahab Projective" point representations can be used.

Although described primarily in terms of hardware above, an example methodology implemented by one or more components of an example system described above may also be embodied in software as a computer program. For example, a program in accordance with example embodiments of the present invention may be a computer program product causing a computer to execute a method for encrypting input data by implementing the functionality as described in FIG. 2, for example.

The computer program product may include a computer-readable medium having computer program logic or code portions embodied thereon for enabling a processor of a system in accordance with example embodiments to perform one or more functions in accordance with an example methodology described above. The computer program logic may thus cause the processor to perform an example method, or one or more functions of an example method described herein.

The computer-readable storage medium may be a built-in medium installed inside a computer main body or removable medium arranged so that it can be separated from the computer main body. Examples of the built-in medium include, but are not limited to, rewriteable non-volatile memories, for example, RAM, ROM, flash memories and hard disks. Examples of a removable medium may include, but are not limited to, optical storage media, for example, CD-ROMs and DVDs; magneto-optical storage media, for example, MOs; magnetism storage media, for example, floppy disks (trademark), cassette tapes, and removable hard disks; media with a built-in rewriteable non-volatile memory, for example, memory cards; and media with a built-in ROM, for example, ROM cassettes.

These programs may also be provided in the form of an externally supplied propagated signal and/or a computer data signal embodied in a carrier wave. The computer data signal embodying one or more instructions or functions of an example methodology may be carried on a carrier wave for transmission and/or reception by an entity that executes the instructions or functions of an example methodology. For example, the functions or instructions of the example method as shown in FIG. 2 may be implemented by processing one or more code segments of the carrier wave in a computer controlling one or more of the components of the example system in FIGS. 3 and/or 4, where instructions or functions may be executed for encrypting data, in accordance with the example method outlined in any of FIGS. 2-4. Further, such programs, when recorded on computer-readable storage media, may be readily stored and distributed. The storage medium, as it is read by a computer, may enable the encrypting of input data in accordance with an example method described herein.

The cryptographic method and system according to example embodiments of the present invention can set a performance degradation level corresponding to the number of changed point representations in the scalar multiplication process, while increasing the complexity of a power analysis attack by masking power tracks in the EC operation, so as not to be distinguished. Although the binary field ECC has been described in the above example embodiments, prime field ECC using an Extended Euclidian algorithm may be implemented with minor modifications, and in its implementation, may be configured to counter the Power Analysis attack.

As described above, a cryptographic method and system according to example embodiments of the present invention can reduce the efficiency of DPA attacks by increasing entropy of power tracks based on randomly changed point representations. Also, since a user can control a randomness rate of the point representations, a performance degradation level and a security resistance level can be set. Accordingly, the cryptographic method and system may be applied to a crypto-system requiring robustness against DPA attacks and which also requires a high operation speed. In addition, the cryptographic method and system may be applicable to prime finite field ECC, through slight modifications and may be readily applied to any well-known crypto-algorithm.

Example embodiments of the present invention being thus described, it will be obvious that the same may be varied in many ways. For example, the functional blocks of FIGS. 2-4 describing an example system and/or method may be implemented in hardware and/or software. The hardware/software implementations may include a combination of processor(s) and article(s) of manufacture. The article(s) of manufacture may further include storage media and executable computer program(s). The executable computer program(s) may include the instructions to perform the described operations or functions. The computer executable program(s) may also be provided as part of externally supplied propagated signal (s). Such variations are not to be regarded as departure from the spirit and scope of example embodiments of the present invention, and all such modifications as would be obvious to one skilled in the art are intended to be included within the scope of the following claims.

What is claimed is:

1. A method for encrypting input data using an encrypting apparatus, comprising:

receiving an input point and a randomness rate;

generating a random selection value and a random position value from the randomness rate;

randomly selecting, based on the randomness rate and the random position value, at least one of the input point and points that are encrypted by performing an elliptic curve (EC) operation over a plurality of rounds;

converting the selected point to a point representation directed by the random selection value; and generating a finally encrypted output point by performing the EC operation over a plurality of rounds based on the input point and a secret key;

wherein receiving the input point and the randomness rate, generating the random selection value, randomly selecting, converting the selected point, and generating the finally encrypted output point are performed by the encrypting apparatus.

2. The method of claim 1, wherein generating the finally encrypted output point further includes applying any one of the non-converted points or the randomly converted point to a subsequent round.

3. The method of claim 1, wherein randomly selecting further includes:

comparing the randomness rate with the random position value before and after each of the plurality of rounds;

determining whether to change the point representation based on the comparison results; and selecting a point before or after a corresponding round based on the determination.

4. The method of claim 1, wherein the randomness rate is set from 0 to 100% by a user.

5. The method of claim 1, wherein the random position value is randomly generated within a range of the randomness rate.

6. The method of claim 1, wherein the random selection value randomly directs one of a plurality of point representations.

7. The method of claim 1, wherein the point representation is one of "Affine," "Ordinary Projective," "Jacobian Projective", "Lopez-Dahab Projective", or other known point representation.

8. The method of claim 1, wherein the EC operation is performed in a binary field.

9. The method of claim 1, wherein the EC operation is performed in a prime finite field.

10. The method of claim 1, wherein converting to the point representation is performed by independent hardware in each round.

11. The method of claim 1, wherein the point representation conversion is performed by shared hardware in each round.

12. A cryptographic system for encrypting input data, comprising:

a scalar multiplication unit adapted to randomly select, based on an input randomness rate and an input random position value, at least one of an input point and points encrypted by elliptic curve (EC) operation over a plurality of rounds, and to generate a finally encrypted output point by performing the EC operation over a plurality of rounds based on the input point and a secret key;

a random number generator adapted to generate a random selection value and the random position value from the randomness rate; and a point representation converter adapted to generate the changed point by converting the selected point to a point representation directed by the random selection value;

wherein the scalar multiplication unit, the random number generator, and the point representation converter are hardware elements.

13. The system of claim 12, wherein the scalar multiplication unit generating the finally encrypted output point further includes applying the changed point obtained by changing a representation of the selected point to a subsequent round.

14. The system of claim 12, wherein the scalar multiplication unit is adapted to compare the randomness rate with the random position value before and after each of the plurality of rounds, to determine whether to change the point representation, to select a point before or after a corresponding round based on the determination, and to output the selected point to the point representation converter.

15. The system of claim 12, wherein the randomness rate is adapted to be set from 0 to 100% by a user.

16. The system of claim 12, wherein the random number generator is adapted to randomly generate the random position value within a range of the randomness rate.

17. The system of claim 12, wherein the random number generator is adapted to generate the random selection value for randomly directing one of a plurality of point representations.

18. The system of claim 12, wherein the point representation is one of "Affine," "Ordinary Projective," "Jacobian Projective", "Lopez-Dahab Projective", or any other known point representation.

19. The system of claim 12, wherein the scalar multiplication unit performs the EC operation in a binary field.

20. The system of claim 12, wherein the scalar multiplication unit performs the EC operation in a prime finite field.

21. A cryptographic system, comprising:

a plurality of elliptic curve (EC) operation units, each adapted to perform an EC operation based on an input point and a secret key in every round;

a plurality of point representation converters, each being located before and after the plurality of EC operation units, each adapted to randomly select, based on a randomness rate and a random position value, at least one of an input point and points encrypted by EC operation, to convert the selected point to a point representation directed by a random selection value, and to output the converted point to an EC operation unit in a subsequent round; and a random number generator adapted to generate the random selection value and the random position value from the randomness rate;

wherein the plurality of EC operation units, the plurality of point representation converters, and the random number generator are hardware elements.

22. The system of claim 21, wherein each of the plurality of point representation converters is adapted to compare the randomness rate with the random position value, to determine whether to change the point representation, and to select a point before or after a corresponding round based on the determination.

23. A computer program product comprising a non-transitory computer-readable medium having computer program logic stored thereon for enabling a processor of a cryptographic system to encrypt input data, the computer program logic causing the processor to perform the functions of:

receiving an input point and a randomness rate;

generating a random selection value and a random position value from the randomness rate;

randomly selecting, based on the randomness rate and the random position value, at least one of the input point and points that are encrypted by performing elliptic curve (EC) operation over a plurality of rounds;

converting the selected point to a point representation directed by the random selection value; and generating a finally encrypted output point by performing the EC operation over a plurality of rounds based on the input point and a secret key.

24. The computer program product of claim 23, wherein generating further includes the computer program logic causing the processor to apply any one of the non-converted points or the randomly converted point to a subsequent round.

25. A non-transitory computer-readable medium storing a program, adapted to cause a computer to execute the method of claim 1.

26. A non-transitory computer-readable storage medium, on which is recorded a program adapted to cause a computer to execute the method of claim 1.

27. A non-transitory computer-readable medium comprising a computer data signal, the computer data signal adapted for directing the encryption of input data in an apparatus configured to receive and encrypt the input data, the computer data signal comprising:

instructions for receiving an input point and a randomness rate;

instructions for generating a random selection value and a random position value from the randomness rate;

instructions for randomly selecting, based on the randomness rate and the random position value, at least one of the input point and points that are encrypted by performing elliptic curve (EC) operation over a plurality of rounds;

instructions for converting the selected point to a point representation directed by the random selection value; and instructions for generating a finally encrypted output point by performing the EC operation over a plurality of rounds based on the input point and a secret key.

28. The non-transitory computer-readable medium of claim 27, wherein the instructions for generating the finally encrypted output point further includes instructions for applying any one of the non-converted points or the randomly converted point to a subsequent round.

* * * * *